United States Patent Office 3,135,648
Patented June 2, 1964

3,135,648
POLYVINYL ALCOHOL ADHESIVE CONTAINING A BORON COMPOUND AND CELLULOSIC ARTICLES LAMINATED THEREWITH
Raymond L. Hawkins, Highland Park, N.J., assignor to Air Reduction Company, Incorporated, New York, N.Y., a corporation of New York
No Drawing. Filed July 13, 1961, Ser. No. 123,614
14 Claims. (Cl. 161—249)

This invention relates to novel polyvinyl alcohol adhesive compositions, to the method of producing these polyvinyl alcohol adhesive compositions, to methods for using the adhesive compositions to form joined structures, and to articles such as laminated structures employing these adhesive compositions. More particularly, the invention relates to the preparation of high wet tack polyvinyl alcohol adhesives containing a water-soluble boron compound and an acid.

Polyvinyl alcohol has been employed in making adhesives; however, in many cases the polyvinyl alcohol is employed in only very small amounts along with other materials. The adhesives which are made with polyvinyl alcohol as the major ingredient possess very low wet tack properties. It has been proposed to improve polyvinyl alcohol adhesives by adding starch. The addition of starch to the polyvinyl alcohol produces an adhesive with increased viscosity; however, the wet tack is not increased to any appreciable extent. Further, the starch acts as a diluent.

It has been discovered that polyvinyl alcohol adhesives possessing high wet tack may be prepared by adding to polyvinyl alcohol a water-soluble boron compound and an amount of an acid such that the pH of the adhesive is below 5.5.

Various methods may be employed in preparing the polyvinyl alcohol adhesives of the present invention. In one method a premix is formed by dissolving the water-soluble boron compound and the acid in water and heating the solution to a temperature of from 160° to 210° F. The premix is then added with agitation to a solution of polyvinyl alcohol in water which has also been heated to from about 160° to 210° F. After combining the premix with the polyvinyl alcohol solution, the mass is cooked with agitation for a short period of time such as about 30 minutes. The mass is then cooled to room temperature and the pH of the mass is determined. If the pH is above 5.5 it is adjusted to 5.5 or below. It is advantageous to employ sufficient acid in the premix in order that the final product has a pH of below 5.5, rather than having to adjust the final product by the addition of more acid, since it has been found that where the pH of the solution at the time of cooking is low, the viscosity of the resulting product is lower than when the pH of the mass at the time of cooking is above 5.5.

In a second method, all of the ingredients are added to cold water, that is, the polyvinyl alcohol, the water-soluble boron compound and acid are added to cold water, and the mass is then heated with agitation to a temperature sufficient to dissolve the polyvinyl alcohol, and the mass is cooked at a temperature of from about 160 to 210° F. for a short period of time such as about 30 minutes.

A further method for the preparation of polyvinyl alcohol adhesives of the present invention consists of forming a dry blend which is comprised of polyvinyl alcohol, a water soluble boron compound and a dry acid such as citric acid. The dry blend may also contain a filler such as clay, a stabilizer such as Dowicide A, and an antifoam agent. This dry blend may be stored for extended periods and shipped to the adhesive user. When it is desired to use the adhesive, the dry blend is added to the appropriate quantity of water with agitation to form a uniform mixture, the mixture is heated to a temperature of from about 160° to about 210° F. and cooked for about 30 minutes.

For the purpose of the present invention any water-soluble boron compound may be employed. Examples of some suitable water-soluble boron compounds are borax, sodium metaborate, sodium pentaborate, boric acid and compounds such as "Polybor" and "FR28." "Polybor" is a special borate product containing approximately 98% disodium octaborate tetrahydrate. The amount of water-soluble boron compound to be employed will depend to some extent on the application for which the adhesive is to be used and upon the form of boron compound which is employed.

It has been found that adhesives having good wet tack are produced if from about 4 to about 15%, based on the weight of polyvinyl alcohol, of the water-soluble boron compound are employed. If less than about 4% of the water-soluble boron compound is employed the adhesive will not possess the desired high wet tack, whereas if over about 15% by weight of water-soluble boron compound is employed syneresis takes place, i.e., the adhesive tends to separate into an aqueous layer and a solids layer, thus rendering the adhesive unusable.

As has been indicated above, it is imperative that the adhesives possess a pH of below 5.5. If the pH is above 5.5, it has been found that the wet tack is low and the viscosity rather high. As the pH decreases from 5.5, the viscosity also decreases and the wet tack increases with the decreasing pH, reaching a maximum at from about 4.7 to 4.9. As the pH is decreased from about 4.7 to about a pH of 2.2, the wet tack decreases slightly; however, even at a pH of 2.2 the wet tack is acceptable. Thus, a suitable adhesive may be made according to the present invention if the pH is maintained within the range of 5.5 to 2.2. Since the wet tack of the adhesive reaches a maximum where the pH is between about 4.7 to 4.9, a pH within this range is especially preferred. As has been indicated above, as the pH decreases the viscosity also decreases; however, even at a pH of 2.2 the adhesive possesses an acceptable viscosity. Since it is frequently desirable to have different viscosity adhesives for different applications, it is apparent that the desired viscosity for a particular application may be obtained by a proper adjustment of the pH.

The pH of the adhesive of the present invention may be controlled by the use of any water soluble acid or acid salt. Examples of suitable water soluble acids are hydrochloric acid, acetic acid, formic acid and phosphoric acid, although other acids may be employed. If a dry blend is to be formed, it is desirable to employ a dry acid such as citric acid, oxalic acid or sulfamic acid. It has also been found that an acid anhydride such as maleic or fumaric anhydride may be employed for controlling the pH. The term acid as employed herein refers to any acidic material which is capable as controlling the pH of the adhesive within the limits set forth.

As is well known, polyvinyl alcohol is prepared by saponifying a vinyl ester, such as polyvinyl acetate, i.e., to convert the acetate groups to hydroxyl groups. The number of acetate groups which are converted to hydroxyl groups is referred to as the degree of hydrolysis. This is frequently expressed as percent hydrolysis, that is, a polyvinyl alcohol which is 85% hydrolyzed is one in which 85% of the acetate groups have been converted to hydroxyl groups. Polyvinyl alcohol having a degree of hydrolysis of from about 80–95% is generally referred to as partially hydrolyzed polyvinyl alcohol. Polyvinyl alcohol having a degree of hydrolysis of about 95–99% is generally referred to as fully hydrolyzed polyvinyl alcohol, and polyvinyl alcohol having a degree of hydrolysis of 99+% is commonly referred to as super fully hydrolyzed polyvinyl alcohol. For the purpose of the present invention polyvinyl alcohol having a percent hydrolysis of 55% to 100% may be employed. Naturally, for a specific application, it may be desirable to employ a polyvinyl alcohol having a particular percent hydrolysis. Polyvinyl alcohol having a particular percent hydrolysis also varies in viscosity, thus it is possible to obtain a low, medium or high viscosity partially hydrolyzed polyvinyl alcohol. The viscosity of the polyvinyl alcohol is determined by the degree of polymerization of the polyvinyl acetate, i.e., if the degree of polymerization of the polyvinyl acetate is high, a high viscosity polyvinyl alcohol will generally result. Thus, here again it is possible to select a desired viscosity polyvinyl alcohol for a specific application; however, any polyvinyl alcohol having a viscosity of 2 to 150 centipoises in a 4% aqueous solution at 20° C. is generally acceptable. Different grades and viscosities of polyvinyl alcohol are available under the trade name Vinol. As an example, Vinol 125 is a super hydrolyzed polyvinyl alcohol which has a degree of hydrolysis of 99.7+% and a medium viscosity of about 30 centipoises in a 4% aqueous solution at 20° C., Vinol 260 has a degree of hydrolysis of 99+% and high viscosity, Vinol 230, a degree of hydrolysis of 99+% and low viscosity, and Vinol 540, 523 and 505 each having a degree of hydrolysis of 87–89% and having a high, medium and low viscosity, respectively. Some of the above-noted grades of polyvinyl alcohol are known as gelling type polyvinyl alcohol. Thus, a gel may form if these are employed in making an adhesive when the adhesive is stored for a period of time. However, this gelling may be overcome by reheating the adhesive prior to use. There are also available non-gelling types of polyvinyl alcohol which may be employed. Vinol 350 and Vinol 325 are non-gelling grades of polyvinyl alcohol having a degree of hydrolysis of 97–98% and a high and medium viscosity, respectively.

In making the adhesives of the present invention, from about 5 to about 25% by weight, based on the weight of water and polyvinyl alcohol, of polyvinyl alcohol may be employed. Especially preferred adhesives are made from aqueous polyvinyl alcohol solutions contining from 7 to 10% by weight of polyvinyl alcohol.

The following example is illustrative of the present invention.

EXAMPLE I 400 g. of a 20% aqueous solution of Vinol 125 polyvinyl alcohol having a viscosity of 30 centipoises in a 4% aqueous solution at 20° C. was heated to 160° F. A premix comprised of 50 g. of water, 10 g. of 10 mole borax and 5 g. of 90% formic acid was heated to 160° F., and 60 g. of this premix were added with agitation to the polyvinyl alcohol solution and the resulting product cooked for about 30 minutes at 160° F. The adhesive was then cooled to room temperature and the pH was 4.8. The adhesive had a relatively high viscosity and very good wet tack.

The high wet tack adhesive prepared according to the present invention is especially advantageous as a paper to paper adhesive and may be employed for such things as forming bag seams, carton manufacturing, paper lining, making of tubes, fiber drums and for solid fiber lamination. This adhesive possesses a high tack and has a good shelf life.

While suitable adhesives may be made according to the present invention as shown in Example I, it is advantageous for many applications to add a filler such as clay to increase the speed of adhesion and to improve holdout. The kaolinite type clays are particularly suitable. Examples of such clays are ASP 100 which is a very fine particle size clay, ASP 600 medium and ASP 400 coarse. The clay may be added to the polyvinyl alcohol, water-soluble boron compound, and water, the mass heated and cooked as described above, or it may be added to the premix or a water-clay mixture, i.e., a clay slip, may be added to the polyvinyl alcohol solution at the same time the premix is added. From about 25 to about 200% by weight, based on the weight of polyvinyl alcohol, of the filler such as clay may be employed.

In the adhesives of the present invention it may be desirable to add an antifoam agent to decrease the tendency of foam formation during the cooking step. A suitable antifoam agent is "Antifoam B" which is an emulsion of a silicone fluid.

The following example illustrates the importance of employing from about 4% to 15%, by weight of polyvinyl alcohol, of a water-soluble boron compound.

EXAMPLE II

| Vinol 125 | 88 g. |
| Boric acid | Varying. |
| 85% $H_3PO_4$ | 1 g. |
| ASP 400 | 60 g. |
| D.C. "B" | 1 g. |
| Water | 850 g. minus the quantity of boric acid. |

A series of adhesives were made using the above basic formulation employing the following procedure.

The boric acid and phosphoric acid were dissolved in the cold water. The clay, polyvinyl alcohol and antifoam agent (designated through the examples as "D.C. 'B'") were added and the mass cooked with agitation for one-half hour at 195° F. The mass was cooled and the pH determined and adjusted, if necessary, to a pH of 4.8±0.1 by adding additional phosphoric acid. The viscosity of the adhesive was determined by a Brookfield viscometer at 25° C. The wet tack of the adhesive was determined by placing about 2 g. of the adhesive on the middle finger, pressing the thumb and forefinger to the adhesive on the middle finger, and separating the middle finger and the forefinger from the thumb, thus stretching the adhesive. The degree of cohesion and the sound produced as the adhesive separated were observed and a rating of from 0 to 100 was given to the adhesive. The adhesive having the least tack was one having the lowest value, while the adhesive having the most tack was the one having the highest value. In the following table are recorded the viscosity and wet tack rating for the adhesives containing various quantities of boric acid which are given in grams and percent by weight based on polyvinyl alcohol.

*Table 1*

| Boric Acid | Percent Boric Acid Based on Polyvinyl Alcohol | Viscosity | Tack Rating |
| --- | --- | --- | --- |
| 0 | 0 | 1,360 | 25 |
| 2 | 2.3 | 1,800 | 30 |
| 4 | 4.5 | 1,900 | 42 |
| 6 | 6.8 | 2,700 | 55 |
| 8 | 9.1 | 3,300 | 67 |
| 9 | 10.2 | 3,500 | 70 |
| 10 | 11.5 | 3,700 | 70 |
| 12 | 13.6 | 4,100 | 75 |

The following examples illustrate the importance of controlling the pH of the adhesive.

EXAMPLE III

| Vinol 125 | 88 g. |
| Boric acid | 9 g. |
| 85% phosphoric acid | Varying. |
| ASP 400 | 60 g. |
| D.C. "B" | 1 g. |
| Water | 842 g. |

The adhesive was made by dissolving the boric acid in cold water, adding the clay, polyvinyl alcohol and antifoam agent and cooking with agitation for one-half hour at 195° F. The adhesive was then cooled. To 8 oz. samples of an adhesive made as indicated above were added varying quantities of 85% phosphoric acid. The pH, viscosity and wet tack were determined for each sample as indicated in Example II and the values appear in Table 2 below.

Table 2

| Drops of $H_3PO_4$ | pH | Viscosity | Tack Rating |
|---|---|---|---|
| 0 | 6.3 | 76,000 | 5 |
| 1 | 5.9 | 35,000 | 10 |
| 3 | 5.8 | 23,000 | 20 |
| 4 | 5.5 | 6,200 | 45 |
| 10 | 5.2 | 4,200 | 50 |
| 20 | 3.8 | 3,100 | 42 |
| 30 | 3.4 | 2,950 | 40 |
| 44 | 2.2 | 3,000 | 35 |

EXAMPLE IV

| | G. |
|---|---|
| Vinol 125 | 88 |
| Boric acid | 9 |
| Concentrated HCl | ½ |
| ASP 400 | 60 |
| D.C. "B" | 1 |
| Water | 842 |

The adhesive was prepared using the above formulation by dissolving the boric acid and hydrochloric acid in cold water, adding the clay, polyvinyl alcohol, and the anti-foam agent, and cooking with agitation at about 195° F. for about one-half hour. The adhesive was cooled and the pH was 5.8. 15 drops of concentrated hydrochloric acid were added to adjust the pH to 4.9. The adhesive had a medium viscosity and good wet tack.

EXAMPLE V

| | G. |
|---|---|
| Vinol 125 | 88 |
| Boric acid | 9 |
| Acetic acid | 1 |
| ASP 400 | 60 |
| D.C. "B" | 1 |
| Water | 842 |

The adhesive was prepared in the same manner as that of Example IV, and after cooling, the adhesive had a pH of 5.2, and 13 drops of acetic acid were added to adjust the pH to 4.7. The adhesive produced possessed an average viscosity and had a good wet tack.

EXAMPLE VI 100 g. of a 10% aqueous solution of polyvinyl alcohol was heated to 160° F. 10 g. of a 10% boric acid solution was heated to 160° F. and combined with the polyvinyl alcohol solution, cooked for about 30 minutes and cooled to room temperature. 90% formic acid was added to adjust the pH to 4.8. The adhesive produced had a medium viscosity and good wet tack.

EXAMPLE VII

| | G. |
|---|---|
| Vinol 125 | 80 |
| Boric acid | 7 |
| ASP 100 | 80 |
| Colloid 513 | 1 |
| Citric acid | 2 |
| Dowicide A | ¼ |
| Water | 830 |

The adhesive was prepared using the above formulation by dissolving the boric acid and citric acid in cold water, adding the clay, polyvinyl alcohol, antifoam agent, and Dowicide A, and cooking with agitation at about 200° F. for about one-half hour. The adhesive was cooled and possessed a pH of 4.5, a viscosity of 2020 centipoises and a tack rating of 72.

The following example illustrates the use of varying amounts of clay.

EXAMPLE VIII

| | |
|---|---|
| Vinol 125 | 88 g. |
| Boric acid | 12 g. |
| 85% $H_3PO_4$ | 1 g. |
| ASP 100 | Varying. |
| D.C. "B" | 1 g. |
| Water | 899 g. minus amount of clay. |

The adhesive was made using the above ingredients by dissolving the boric acid and phosphoric acid in the cold water, adding the clay, antifoam and polyvinyl alcohol, heating to 195° F. and cooling. The pH was adjusted to about 4.8. The number of grams of ASP 100, the viscosity, wet tack and fiber tear are recorded in Table 3 below. The viscosity and tack were determined as in Example II. The fiber tear was determined by placing two lines of adhesive 0.003 inch deep and ⅜ inch wide on kraft paper, covering with kraft paper, pressing the two sheets of kraft paper between two glass plates, and pulling the two pieces of kraft paper apart. The samples were evaluated one against the other and given a number of from 1 to 6, with 1 representing the sample having the least amount of fiber tear and 6 representing the sample with the greatest amount of fiber tear.

Table 3

| ASP 100, grams | Viscosity | Tack | Fiber Tear |
|---|---|---|---|
| 20 | 3,150 | 65 | 6 |
| 40 | 4,000 | 80 | 3 |
| 60 | 4,900 | 75 | 4 |
| 100 | 5,300 | 70 | 5 |
| 120 | 7,500 | 60 | 1 |
| 140 | 6,600 | 55 | 2 |

EXAMPLE IX

| | G. |
|---|---|
| Vinol 125 | 450 |
| Boric acid | 40 |
| ASP 100 | 450 |
| Citric acid | 9 |
| Dowicide A | 1 |

A dry blend of the above ingredients was formed. 170 g. of the dry blend were added to 830 g. of cold water with agitation to form a uniform dispersion. The dispersion was heated to 200° C. and cooked for 30 minutes. The adhesive was cooled to room temperature and had a pH of 4.9. The adhesive had a viscosity of 2100 centipoises and a tack rating of 70.

EXAMPLE X

| | G. |
|---|---|
| Vinol 125 | 100 |
| Boric acid | 9 |
| ASP 100 | 100 |
| Oxalic acid | 1 |
| Dowicide A | ¼ |

A dry blend of the above ingredients was formed. 170 g. of the blend were added to 830 g. of water with agitation to form a uniform dispersion. The pH of the dispersion was 4.9. The uniform dispersion was heated to 200° F. and cooked at this temperature for about one-half hour. The adhesive was cooled to room temperature and possessed a pH of 5.1, a viscosity of 2700 centipoises and a tack rating of 70.

EXAMPLE XI

| | G. |
|---|---|
| Vinol 125 | 100 |
| Boric acid | 9 |
| ASP 100 | 100 |
| Sulfamic acid | 1 |
| Dowicide A | ¼ |

The dry blend and adhesive were made as described in Example X. The pH of the dispersion before cooking was 4.8. The pH of the adhesive after cooking was 4.9, the viscosity was 2600 centipoises, and the tack rating was 69.

EXAMPLE XII

| | G. |
|---|---|
| Vinol 125 | 100 |
| Boric acid | 9 |
| ASP 100 | 100 |
| Maleic anhydride | 1 |
| Dowicide A | ¼ |

The dry blend and adhesive were made as described in Example X. The pH of the dispersion before cooking was 4.9, and the pH of the adhesive after cooking was 5.0. The adhesive had a viscosity of 2550 centipoises and a tack rating of 70.

As has been indicated above, the present adhesive is especially adapted for use in producing a structure by joining two or more plies of a cellulosic material such as paper or board. Some examples of typical uses of this nature are joining of bag seams, carton manufacturing, paper lining, making of tubes, fiber drums and solid fiber lamination. The adhesive may be used with any type of adhesive or glue joining equipment and is especially adapted for equipment which is run at high speeds.

The following example illustrates the use of the adhesive of the present invention in producing a solid fiber lamination.

EXAMPLE XIII

| | Parts |
|---|---|
| Vinol 125 | 80 |
| Boric acid | 7 |
| 85% H₃PO₄ | 2 |
| ASP 600 | 80 |
| D.C. "B" | 1 |
| Water | 830 |

The adhesive was made employing the above formulation by placing 200 lbs. of cold water in a 55 gallon drum and dissolving therein the boric acid and H₃PO₄. The clay, polyvinyl alcohol and antifoam agent were added to the solution with stirring and the mass was agitated for about 5 minutes and then sparged with live steam until the mass was heated to 200° F. When the temperature reached 200° F. the steam was discontinued and the mass cooked with agitation for 30 minutes. The adhesive was then allowed to cool overnight to a temperature of 100° F. The remaining water was added to bring the total weight of the adhesive to 400 lbs. The adhesive had a pH of 4.8. The adhesive was then fed into a 7 gallon glue pot which was part of a commercial solid fiber laminating apparatus. The adhesive was applied to one side of a 20 point (0.020 in.) chip board by a direct roll running in the glue pot. A kraft paper liner was then laminated to the chip board containing the adhesive by passing the two layers through a nip roll. Sheets were then cut and stacked. The apparatus was operating at 400 ft./min. and between 3.6 and 8.4 lbs. of wet adhesive were applied to 1000 sq. ft. of board. The laminated product formed an excellent water-resistant bond with the sheets flat and no wrinkles or curls.

The viscosities of the polyvinyl alcohol-adhesives presented above are given in centipoises and were measured at 25° C. unless otherwise indicated.

Obviously, many modifications and variations of the invention as hereinbefore set forth may be made without departing from the spirit and scope thereof, and therefore only such limitations should be imposed as are indicated in the appended claims.

This is a continuation-in-part of my copending application entitled: "Polyvinyl Alcohol Adhesive," Serial No. 104,535, filed April 21, 1961, now abandoned.

I claim:

1. A polyvinyl alcohol adhesive having good wet tack comprising an aqueous solution of polyvinyl alcohol containing from 5 to 25% by weight of solution of polyvinyl alcohol, at least about 25 percent of clay, based on the weight of polyvinyl alcohol, 4 to 15%, based on the weight of polyvinyl alcohol, of a water-soluble boron compound and an amount of an acid such that the adhesive has a pH of below 5.5.

2. A polyvinyl alcohol adhesive having good wet tack comprising an aqueous solution of polyvinyl alcohol containing from 5 to 25% by weight of solution of polyvinyl alcohol, from about 25% to about 200%, based on the weight of polyvinyl alcohol, of clay, 4 to 15%, based on the weight of polyvinyl alcohol, of a water-soluble boron compound, and an amount of an acid such that the adhesive has a pH of below 5.5.

3. A polyvinyl alcohol adhesive having good wet tack comprising an aqueous solution of polyvinyl alcohol containing from 7 to 10% by weight of solution of polyvinyl alcohol, from about 25% to about 200%, based on the weight of polyvinyl alcohol, of clay, 4 to 15% based on the weight of polyvinyl alcohol, of a water-soluble boron compound, and an amount of a water-soluble acid such that the adhesive has a pH of between 4.7 and 4.9.

4. A dry blend adapted to form an adhesive comprising polyvinyl alcohol, 4 to 15% based on the weight of polyvinyl alcohol of a water-soluble boron compound, 25 to 200% based on the weight of polyvinyl alcohol of clay and a dry water-soluble acid, the amount of said acid being such that when the adhesive is produced by adding sufficient water to give an aqueous solution of polyvinyl alcohol and water containing from 5 to 25% by weight of polyvinyl alcohol, the pH is below 5.5.

5. A dry blend adapted to form an adhesive which is comprised of polyvinyl alcohol, 4 to 15% based on the weight of polyvinyl alcohol of a water-soluble boron compound, 25 to 200% based on the weight of polyvinyl alcohol of clay and a dry water-soluble acid, the amount of said acid being such that when the adhesive is produced by adding sufficient water to give an aqueous solution of polyvinyl alcohol and water containing from 7 to 10% by weight of polyvinyl alcohol, the pH is between 4.7 and 4.9.

6. A method of preparing joined cellulosic structures which comprises applying an adhesive film to one portion of the structure, placing a second portion of the structure on the adhesive film and applying pressure to join the two portions of the structure together, said adhesive film comprising an aqueous solution of polyvinyl alcohol containing from 5 to 25% by weight of solution of polyvinyl alcohol, at least about 25 percent of clay, based on the weight of polyvinyl alcohol, 4 to 15%, based on the weight of polyvinyl alcohol, of a water-soluble boron compound, and an amount of an acid such that the adhesive has a pH of below 5.5.

7. A method of preparing joined cellulosic structures which comprises applying an adhesive film to one portion of the structure, placing a second portion of the structure on the adhesive film and applying pressure to join the two portions of the structure together, said adhesive film comprising an aqueous solution of polyvinyl alcohol containing from 5 to 25% by weight of solution, of polyvinyl alcohol, from about 25% to about 200%, based on the weight of polyvinyl alcohol, of clay, 4 to 15%, based on the weight of polyvinyl alcohol, of a water-soluble boron compound, and an amount of an acid such that the adhesive has a pH of below 5.5.

8. A joined cellulosic structure comprising at least two component parts, the surfaces of which are adhesively united through a dried down film of an adhesive comprising an aqueous solution of polyvinyl alcohol containing from 5 to 25% by weight of solution of polyvinyl alcohol, at least about 25 percent of clay, based on the weight of polyvinyl alcohol, 4 to 15%, based on the weight of polyvinyl alcohol, of a water-soluble boron compound, and an amount of an acid such that the adhesive has a pH of below about 5.5.

9. A joined cellulosic structure comprising at least two component parts, the surfaces of which are adhesively united through a dried down film of an adhesive comprising an aqueous solution of polyvinyl alcohol containing from 5 to 25% by weight of solution of polyvinyl alcohol, from about 25% to about 200%, based on the weight of polyvinyl alcohol, of clay, 4 to 15%, based on the weight of polyvinyl alcohol, of a water-soluble boron compound, and an amount of an acid such that the adhesive has a pH of below about 5.5.

10. A method for preparing a polyvinyl alcohol adhesive which comprises forming an aqueous solution containing from 5 to 25% by weight polyvinyl alcohol, at least about 25 percent of clay, based on the weight of polyvinyl alcohol, from 4 to 15% by weight of a water-soluble boron compound, based on the weight of polyvinyl alcohol, and an amount of a water-soluble acid such that the final pH of the adhesive does not exceed 5.5, and heating the solution to a temperature in the range of 160° to 210° F.

11. A method according to claim 10 wherein said solution contains from 25 to 200% by weight of clay, based on the weight of polyvinyl alcohol.

12. A method for producing a polyvinyl alcohol adhesive having good wet tack which comprises adding from 4 to 15% by weight of a water-soluble boron compound, based on the weight of polyvinyl alcohol, at least about 25 percent of clay, based on the weight of polyvinyl alcohol, and a water-soluble acid, to an aqueous solution of polyvinyl alcohol containing from 5 to 25% by weight of polyvinyl alcohol, and heating the solution to a temperature of from about 160° F. to about 210° F., said acid being added in an amount such that the final product has a pH of less than 5.5.

13. A method for producing a polyvinyl alcohol adhesive having a good wet tack which comprises adding from 4 to 15% by weight of a water-soluble boron compound, based on the weight of polyvinyl alcohol, from about 25 to about 200% of clay, based on the weight of polyvinyl alcohol, and a water-soluble acid, to an aqueous solution of polyvinyl alcohol which contains from 5 to 25% by weight of polyvinyl alcohol, and heating the solution to a temperature of from about 160° F. to about 210° F., said acid being added in an amount such that the final product has a pH of from 2.2 to 5.5.

14. A method of preparing joined cellulosic structures which comprises applying an adhesive film to one portion of the structure, placing a second portion of the structure on the adhesive film and applying pressure to join the two portions of the structure together, said adhesive film comprising an aqueous solution of polyvinyl alcohol containing from 5 to 25% by weight of solution of polyvinyl alcohol, 4 to 15%, based on the weight of polyvinyl alcohol, of a water-soluble boron compound, and an amount of an acid such that the adhesive has a pH of about 2.2 to about 4.9.

References Cited in the file of this patent
UNITED STATES PATENTS

| | | |
|---|---|---|
| 2,324,601 | Spanagel | July 20, 1943 |
| 2,413,570 | Krister et al. | Dec. 31, 1946 |
| 2,439,108 | Staehle | Apr. 6, 1948 |
| 2,495,845 | Jefferson et al. | Jan. 31, 1950 |

UNITED STATES PATENT OFFICE
CERTIFICATE OF CORRECTION

Patent No. 3,135,648            June 2, 1964

Raymond L. Hawkins

It is hereby certified that error appears in the above numbered patent requiring correction and that the said Letters Patent should read as corrected below.

Column 3, line 44, for "contining" read -- containing --; column 4, line 28, for "through" read -- through-out --; column 6, line 27, for "greates" read -- greatest --; column 10, line 5, strike out "a".

Signed and sealed this 10th day of November 1964.

(SEAL)
Attest:

ERNEST W. SWIDER            EDWARD J. BRENNER
Attesting Officer            Commissioner of Patents